US012646342B2

(12) United States Patent
Almers et al.

(10) Patent No.: US 12,646,342 B2
(45) Date of Patent: Jun. 2, 2026

(54) METHOD FOR PROCESSING DIGITAL IMAGES OF A MICROSCOPIC SAMPLE AND MICROSCOPE SYSTEM

(71) Applicant: CellaVision AB, Lund (SE)

(72) Inventors: Martin Almers, Lund (SE); Jesper Jönsson, Lund (SE)

(73) Assignee: CELLAVISION AB, Lund (SE)

( * ) Notice: Subject to any disclaimer, the term of this patent is extended or adjusted under 35 U.S.C. 154(b) by 0 days.

(21) Appl. No.: 18/996,126

(22) PCT Filed: Jul. 21, 2023

(86) PCT No.: PCT/EP2023/070362
§ 371 (c)(1),
(2) Date: Jan. 17, 2025

(87) PCT Pub. No.: WO2024/018081
PCT Pub. Date: Jan. 25, 2024

(65) Prior Publication Data
US 2025/0356668 A1      Nov. 20, 2025

(30) Foreign Application Priority Data
Jul. 22, 2022    (EP) .................................... 22186412

(51) Int. Cl.
*G06V 20/69*          (2022.01)
*G02B 21/06*          (2006.01)
(Continued)

(52) U.S. Cl.
CPC ........... *G06V 20/698* (2022.01); *G02B 21/06* (2013.01); *G02B 21/367* (2013.01);
(Continued)

(58) Field of Classification Search
CPC .. G06V 20/698; G06V 20/693; G06V 10/141; G06V 10/764; G02B 21/367; G02B 21/365; G02B 21/06
(Continued)

(56) References Cited

U.S. PATENT DOCUMENTS 10,754,140 B2      8/2020   Chan et al.
2017/0363853 A1    12/2017  Besley
(Continued)

OTHER PUBLICATIONS

International Search Report and Written Opinion, PCT Application No. PCT/EP2023/070362, mailed Oct. 12, 2023, 14 pages.
(Continued)

*Primary Examiner* — Sherrie Hsia
(74) *Attorney, Agent, or Firm* — XSENSUS LLP

(57) ABSTRACT

The present inventive concept relates to a microscope system and a method for processing a plurality of digital images of a sample. The method comprises: acquiring a first input set of digital images by: illuminating, by an illumination system, the sample with a first subset of a plurality of illumination patterns, and capturing a digital image of the sample for each illumination pattern of the first subset of the plurality of illumination patterns, thereby forming the first input set of digital images; inputting the first input set of digital images into a first set of machine learning models configured to output a first inference output; acquiring a second input set of digital images by: illuminating, by the illumination system, the sample with a second subset of the plurality of illumination patterns, and capturing a digital image of the sample for each illumination pattern of the second subset of the plurality of illumination patterns, thereby forming the second input set of digital images; inputting the second input set of digital images into a second set of machine learning models configured to output a second inference output, wherein the second set of machine (Continued)

learning models is different from the first set of machine learning models; and inputting the first inference output and the second inference output into an image processing machine learning model being trained to process the plurality of digital images of the sample using the first inference output and the second inference output.

10 Claims, 2 Drawing Sheets

(51) Int. Cl.
    *G02B 21/36*      (2006.01)
    *G06V 10/141*      (2022.01)
    *G06V 10/764*      (2022.01)
(52) U.S. Cl.
    CPC .......... *G06V 10/141* (2022.01); *G06V 10/764* (2022.01); *G06V 20/693* (2022.01)

(58) Field of Classification Search
    USPC ............................. 348/79, 80; 382/155, 128
    See application file for complete search history.

(56)            References Cited

U.S. PATENT DOCUMENTS

2024/0183655 A1 *   6/2024   Von Finck ........... G01B 11/303
2025/0355237 A1 *   11/2025   Liao ..................... G06V 20/693

OTHER PUBLICATIONS

Nguyen et al., "Deep Learning In Computational Microscopy," SPIE Proceedings, SPIE, US, vol. 10990, May 13, 2019, pp. 1099007-1-10990007-11.

* cited by examiner

1st set of images 300A

METHOD FOR PROCESSING DIGITAL IMAGES OF A MICROSCOPIC SAMPLE AND MICROSCOPE SYSTEM

RELATED APPLICATIONS

This application is a U.S. national stage application under 35 U.S.C. 371 of International Application No. PCT/EP2023/070362, filed Jul. 21, 2023, which claims priority to and the benefit of European Application No. EP 22186412.7, filed Jul. 22, 2022, the contents of which are incorporated into the present application by reference in their entireties.

TECHNICAL FIELD

The present inventive concept relates to processing a plurality of digital images of a sample.

BACKGROUND

Microscopy is widely used to analyze samples of different kinds. Examples of such samples include, but are not limited to, blood and bone marrow. With the increased digitalization, new and exciting technologies for producing highly detailed images of small features in imaged samples have been developed. Some of these technologies are typically referred to as computational imaging. In computational imaging, images of a sample are typically processed in some form in order to produce more detailed information of the sample than what would normally be possible. An example of such technology is Fourier Ptychography Microscopy (FPM). FPM is a technique which allows for the construction of an image of a sample having a higher resolution than what the optical components used to image the sample normally allows. This is done by illuminating the sample from several distinct directions, and then combining the image data in Fourier space in an iterative, computationally intensive process.

A problem related to FPM is the large number of images (typically several hundreds), each captured using illumination from a distinct direction, needed in order to construct the high-resolution image of the sample as well as the time needed for the actual image construction process. Due to the iterative nature of the image construction process, the image reconstruction typically requires large amounts of time. Put differently, a disadvantage of FPM is that it typically is a slow process for producing high-resolution images of a sample. Thus, there exists a need for improvement within the art.

SUMMARY

It is an object to, at least partly, mitigate, alleviate, or eliminate one or more of the above-identified deficiencies in the art and disadvantages singly or in any combination and solve at least the above-mentioned problem.

It is an object of the present inventive concept to provide a more time-efficient method for processing digital images of a sample.

It is an object of the present inventive concept to provide a microscope system allowing for a more time-efficient processing digital images of a sample.

It is an object of the present inventive concept to provide a method and/or a microscope system that allows a more efficient (e.g., time-efficient) analysis of a sample.

According to a first aspect a method for processing a plurality of digital images of a sample is provided. The method comprising: a. acquiring a first input set of digital images by: illuminating, by an illumination system, the sample with a first subset of a plurality of illumination patterns, and capturing a digital image of the sample for each illumination pattern of the first subset of the plurality of illumination patterns, thereby forming the first input set of digital images; b. inputting the first input set of digital images into a first set of machine learning models configured to output a first inference output; c. acquiring a second input set of digital images by: illuminating, by the illumination system, the sample with a second subset of the plurality of illumination patterns, and capturing a digital image of the sample for each illumination pattern of the second subset of the plurality of illumination patterns, thereby forming the second input set of digital images; d. inputting the second input set of digital images into a second set of machine learning models configured to output a second inference output, wherein the second set of machine learning models is different from the first set of machine learning models; and e. inputting the first inference output and the second inference output into an image processing machine learning model being trained to process the plurality of digital images of the sample using the first inference output and the second inference output.

Within the context of this disclosure, the wording "machine learning model" should be construed as a machine learning model suitable for image processing. The first set of machine learning models and the second set of machine learning models may have the same structure (e.g., number of machine learning models, number of layers in each machine learning model, activation functions, etc.) or different structures. Each set of machine learning models may comprise one or more machine learning models. For instance, the first set of machine learning models may comprise a single machine learning model. Similarly, the second set of machine learning models may comprise a single machine learning model. It is however to be understood that the number of machine learning models in each of the first and second sets of machine learning models may vary. Hence, each of the first and second sets of machine learning models may comprise more than one machine learning model.

By means of the present inventive concept, a time period needed for the processing of the plurality of digital images of the sample is allowed to be reduced. In particular, since the processes of acquiring the digital images and the inference of the acquired digital images are time-consuming, it may be advantageous to separate the step of acquiring the digital images of the sample in at least two. This, in turn, may allow the inference of the first input set of digital images to be initiated before/during the acquisition process of the second input set of digital images, which may lead to a less time-consuming processing of the plurality of digital images. Reducing a time period associated with the image processing may, in turn, allow for a less time-consuming analysis of the sample.

A further associated advantage is that memory requirements associated with the processing of the plurality of digital images may be reduced. For example, since the first input set of digital images and the second input set of digital images may be processed (i.e., input to their respective sets of machine learning models), at least partly, in sequence, and the two input sets of digital images may thereby be stored, at least partly, sequentially in memory (e.g., working memory). Put differently, the first and second input sets of digital images may be processed without having to store both the first and second input sets of digital images simultaneously in memory.

Steps b and c may be performed at least partially in parallel. Put differently the processing of the first input set of digital images by the first set of machine learning models may be performed at least partially in parallel with the acquisition of the second set of digital images.

An associated advantage is that a time period needed for the processing of the plurality of images of the sample may be further reduced. This, since the inference of the first input set of digital images may be performed at least partially in parallel with the acquiring process of the second input set of digital images. Preferably, step c is initiated as soon as step a is finished. Hence, step c may be initiated prior to step b.

The illumination system may comprise a plurality of light sources, and wherein each illumination pattern of the plurality of illumination patterns may be formed by one or more light sources of the plurality of light sources.

An associated advantage is that the digital images of the sample may captured under different illumination conditions, whereby more information (e.g., information associated with a refractive index) of the sample may be collected in the captured digital images.

Each light source of the plurality of light sources may be configured to illuminate the sample from one direction of a plurality of directions.

By illuminating the sample from a plurality of different directions and capturing a digital image for each of the plurality of directions, information regarding finer details of the sample may be captured than what normally is resolvable by a conventional microscope (i.e., using a conventional microscope illumination) used to image the sample. This can be understood as information of different portions of Fourier space (i.e., the spatial frequency domain) of associated with the sample are captured for different illumination patterns (e.g., different illumination directions). This technique may be known in the art as Fourier Ptychography. Further, by illuminating the sample with a plurality of different illumination patterns and capturing a digital image for each of the plurality of illumination patterns, information regarding a refractive index associated with the sample may be captured. This can be understood as an effect of refraction of light being dependent on an angle of incident for light illuminating the sample and the refractive index of the sample. Information regarding the refractive index of the sample may, in turn, allow phase information (typically referred to as quantitative phase within the art) associated with the sample to be determined. Since the plurality of digital images comprises information associated with one or more of fine details of the sample, a refractive index associated with the sample, and phase information associated with the sample, this information may be used by one or more of the first set of machine learning models, the second set of machine learning models, and the image processing machine learning model. This may, in turn, allow for more information associated with the sample to be extracted from the plurality of digital images than what would be allowed in case the plurality of digital images were captured from only one direction or by using conventional microscopy. Using conventional microscopy (e.g., by illuminating the sample from a majority of the plurality of directions up to a numerical aperture of the microscope objective used to image the sample), it may be difficult, or even impossible, to capture information associated with the refractive index associated with the sample and/or phase information associated with the sample. Illuminating the sample with a plurality of different illumination patterns may further allow for the capture of information relating to details of the sample which are finer than what normally is allowed by a microscope objective used to image the sample. Thus, a microscope objective having a relatively lower magnification may be used while still being able to capture information related to fine details of the sample. Using a relatively lower magnification microscope objective may, in turn, allow for relatively larger portions of the sample to be imaged at each imaging position. Hence, the entire sample may be scanned by imaging at relatively fewer positions which, in turn, may allow for a faster imaging of the entire sample or at least a majority of the sample.

At least one direction of the plurality of directions may correspond to an angle larger than a numerical aperture of a microscope objective used to image the sample.

The numerical aperture of the microscope objective may be a dimensionless number associated with a range of angles over which the microscope objective accepts light. Hence, a direction larger than the numerical aperture may be understood as a direction corresponding to an angle larger than the range of angles over which the microscope objective accepts light.

By illuminating the sample from a direction corresponding to an angle larger than the numerical aperture of a microscope objective, the digital image captured for that angle of illumination may comprise information about higher spatial frequencies of the sample, and thereby finer details, than the microscope objective normally allows (e.g., using conventional microscopy illumination). This may, in turn, allow for the microscope objective to capture phase information associated with the sample and/or information relating to details not normally being resolvable by the microscope objective. Such information may, in turn, may be extracted and/or used by one or more of the first set of machine learning models, the second set of machine learning models, and the image processing machine learning model during the processing of the digital images. Put differently, by illuminating the sample from a direction corresponding to an angle larger than the numerical aperture of the microscope objective may result in digital images from which the machine learning model may extract more information associated with the sample than what normally is allowed (e.g., when using conventional microscopy illumination).

The first subset of illumination patterns may be different from the second subset of illumination patterns.

An associated advantage is that a time period needed for the processing and/or capture of the plurality of images of the sample may be further reduced. This, since the first input set of digital images and the second input set of digital images may comprise less redundant information. Put differently, the first input set of digital images and the second input set of digital images may not comprise digital images captured under the same illumination conditions (i.e. illumination patterns). Redundant information in the first and second inputs sets of digital images may not be needed, since the first and second inference outputs are used by the image processing machine learning model. Hence, any redundant information in the first and second inference outputs may lead to unnecessary computations by the image processing machine learning model. Thus, by reducing redundant information, computational resources associated with the process of the first and second inference outputs by the image processing machine learning model may be reduced.

The image processing machine learning model may be trained to process the plurality of digital images using the first inference output and the second inference output by being trained to one or more of: construct a digital image of the sample; classify the sample into one or more classes; and detect one or more objects within the sample. The image processing machine learning model may be configured to construct a digital image depicting the sample.

In case the image processing machine learning model is trained to construct a digital image of a sample, that digital image of the sample may have a relatively higher resolution than a digital image captured by the microscope system using conventional microscopy illumination (e.g., bright-field conditions). Put differently, the image processing machine learning model may be trained to construct a digital image of the sample having a relatively higher resolution than a digital image of the first input set of digital images and/or a digital image of the second input set of digital images.

In case the image processing machine learning model is trained to classify the sample into one or more classes, those classes may vary depending on a sample type. For instance, in case the sample is a biological sample (e.g., blood, bone marrow, a body fluid, etc.), the one or more classes may comprise, but are not limited to: whether the sample is cancerous, is infected by a disease, is abnormal, belongs to a specific classification, etc. Put differently, which information the one or more classes comprises may depend on the type of the sample. For example, in case the sample comprises white blood cells, the one or more classes may comprise information about different white blood cell types. In case the sample comprises red blood cells, the one or more classes may comprise information about red blood cell morphologies. In case the sample comprises cervix fluid, the one or more classes may comprise information about pap smear abnormalities. The sample may be a non-biological sample. For instance, the sample may be at least a portion of a printed circuit board (PCB). In such case, the one or more classes may be whether the portion of the PCB is according to specification (e.g., correctly manufactured, damaged, etc.).

In case the image processing machine learning model is trained to detect one or more objects within a sample, such object may comprise, but are not limited to: malaria, white blood cells, red blood cells, platelets, platelet clumps, etc. The one or more objects may, e.g., be a portion of the sample. For instance, the object may be a portion of the sample which is suitable for collection and classification of certain cell types. This may be useful in case the sample is bone marrow. The image processing machine learning model may be further trained to determine a type of the detected objects. This may be a classification of the sample into one or more classes. The image processing machine learning model may be further configured to determine a number of detected objects. Hence, the image processing machine learning model may be trained to count objects within a sample.

According to a second aspect a microscope system is provided. The microscope system comprising: an illumination system configured to illuminate a sample with a plurality of illumination patterns; an image sensor configured to capture digital images of the sample; a microscope objective configured to image the sample onto the image sensor; and circuitry configured to execute: a first acquisition function configured to control the illumination system to illuminate the sample with a first subset of the plurality of illumination patterns, and to control the image sensor to capture a digital image of the sample for each illumination pattern of the first subset of the plurality of illumination patterns, thereby forming a first input set of digital images, a first inference function configured to input the first input set of digital images into a first set of machine learning models configured to output a first inference output, a second acquisition function configured to control the illumination system to illuminate the sample with a second subset of the plurality of illumination patterns, and to control the image sensor to capture a digital image of the sample for each illumination pattern of the second subset of the plurality of illumination patterns, thereby forming a second input set of digital images, a second inference function configured to input the second input set of digital images into a second set of machine learning models configured to output a second inference output, wherein the second set of machine learning models is different from the first set of machine learning models, and a processing function configured to input the first inference output and the second inference output into an image processing machine learning model being trained to process the plurality of digital images of the sample using the first inference output and the second inference output.

The circuitry may be configured to execute the first inference function and the second acquisition function at least partially in parallel.

The illumination system may comprise a plurality of light sources, and wherein each illumination pattern of the plurality of illumination patterns may be formed by one or more light sources of the plurality of light sources.

Each light source of the plurality light sources may be configured to illuminate the sample from one direction of a plurality of directions.

At least one direction of the plurality of directions may correspond to an angle larger than a numerical aperture of the microscope objective being configured to image the sample onto the image sensor.

The plurality of light sources may be arranged on a curved surface being concave along at least one direction along the surface.

Arranging the plurality of light sources on a curved surface may be advantageous in that the distance from each light source to a current imaging position (i.e., a position or portion of the sample currently being imaged) of the microscope system may be similar. Since this distance is similar, an intensity of light emitted from each light source may be similar at the current imaging position (given that each light source is configured to emit light of similar intensity). This may be understood as an effect of the inverse square law. Thus, the sample may be illuminated by light having similar intensities for each direction in the plurality of directions, which may, in turn, allow for a more homogenous illumination of the sample independent of illumination direction and/or illumination pattern (in case each illumination pattern is formed by the same number of light sources). It may be advantageous to configure the illumination system such that the distance from each light source to the current imaging position is large enough such that each light source may be regarded as a point source. This may allow the light to be quasi-coherent at the current imaging position. Hence, the distance from each light source to the current imaging position may be chosen such that an intensity of light from each light source at the current imaging position is high enough to produce the input set of digital images.

The curved surface may be formed of facets. Put differently, the curved surface may be constructed by a plurality of flat surfaces. In other words, the curved surface may be piecewise flat.

An associated advantage is that the illumination system may be easier to manufacture, thereby reducing associated economic costs. A further associated advantage is that the illumination system may be modular. It may thereby be easier to replace one or more light sources (e.g., in case they break and/or are defective).

A numerical aperture of the microscope objective may be 0.4 or lower. Put differently, the at least one microscope objective may have a magnification of 20 times or lower.

An associated advantage is that a relative larger portion of the sample may be imaged at a time compared to a microscope objective having a relatively higher numerical aperture. This may, in turn, allow for a number of individual imaging positions needed to image a majority of the sample to be reduced. Thus, a time needed to image a majority (e.g., the entire) of the sample may thereby be reduced.

The image processing machine learning model may be trained to process the plurality of digital images using the first inference output and the second inference output by being trained to: construct a digital image of the sample; and/or classify the sample into one or more classes; and/or detect one or more objects within the sample.

The above-mentioned features of the first aspect, when applicable, apply to this second aspect as well. In order to avoid undue repetition, reference is made to the above.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the inventive concept. The figures should not be considered limiting the inventive concept to the specific variant; instead they are used for explaining and understanding the inventive concept. As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figures 1, 2:
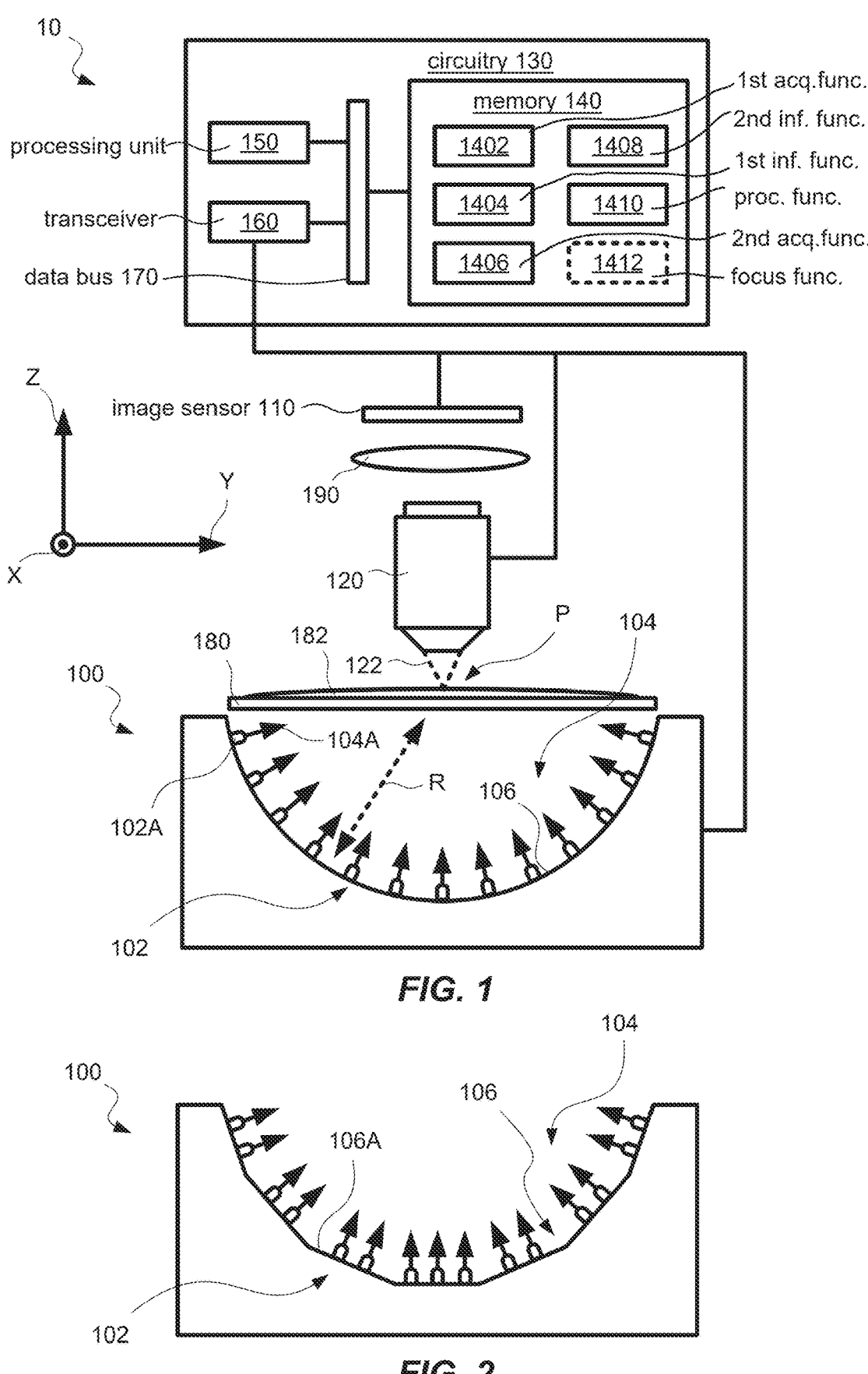
FIG. 1 illustrates a microscope system.
FIG. 2 illustrates an illumination system.

FIG. 1 illustrates a microscope system 10. The microscope system 10 comprises an illumination system 100, an image sensor 110, a microscope objective 120, and circuitry 130. As is illustrated in the example of FIG. 1, the microscope system 10 may further comprise one or more of a sample holder 180 and a relay lens 190. The circuitry 130 is configured to execute a first acquisition function 1402, a first inference function 1404, a second acquisition function 1406, a second inference function 1408, and a processing function 1410. As is illustrated in the example of FIG. 1, the circuitry 130 may be further configured to execute a focus function 1412.

In the example of FIG. 1, the sample holder 180 comprises a microscope slide onto which the sample 182 has been applied. It is to be understood that the sample 182 may be covered by a coverslip (not illustrated in FIG. 1). The sample holder 180 may be configured to hold the sample 182. The sample holder 180 may be movable (e.g., by being coupled to manual and/or motorized stages), thereby allowing the sample 182 to be moved such that different portions of the sample 182 may be imaged by the microscope objective 120. The sample holder 180 may be movable in a plane parallel to a major surface of the sample holder 180. In the example of FIG. 1, the sample holder 180 is movable in a plane parallel to a first axis X and a second axis Y. The sample holder 180 may be movable along a horizontal plane. It is further to be understood that the sample holder 180 may be movable along a third axis Z. This may allow the sample 182 to be moved relative to the microscope objective 120 such the sample 182 is in focus.

Even though the circuitry 130 is illustrated as a separate entity in FIG. 1, it is to be understood that the circuitry 130 may form part of a computing device. For instance, the computing device may be a computer, a server (e.g., a local server and/or a cloud server), a smartphone, etc. It is further to be understood that the functionality of the circuitry 130 may be distributed over more than one computing device. Even though not explicitly illustrated in FIG. 1, the computing device may comprise further components, for example input devices (mouse, keyboard, touchscreen, etc.) and/or a display. As is illustrated in the example of FIG. 1, the circuitry 100 may comprise one or more of a memory 140, a processing unit 150, a transceiver 160, and a data bus 170. The memory 140, the processing unit 150, and the transceiver 160 may communicate (e.g., exchange data) via the data bus 170. The processing unit 150 may comprise a central processing unit (CPU) and/or a graphical processing unit (GPU). The transceiver 160 may be configured to communicate with external devices. For example, the transceiver 160 may be configured to communicate with servers, computers, external peripherals (e.g., external storage), etc. The external devices may be local devices or remote devices (e.g., a cloud server). The transceiver 160 may be configured to communicate with the external devices via an external network (e.g., a local-area network, the internet, etc.) The transceiver 160 may be configured for wireless and/or wired communication. Suitable technologies for wireless communication are known to the skilled person. Some non-limiting examples comprise Wi-Fi and Near-Field Communication (NFC). Suitable technologies for wired communication are known to the skilled person. Some non-limiting examples comprise USB, Ethernet, and Firewire.

The memory 140 may be a non-transitory computer-readable storage medium. The memory 140 may be a random-access memory. The memory 140 may be a non-volatile memory. As is illustrated in the example of FIG. 1, the memory 140 may store program code portions 1402, 1404, 1406, 1408, 1410, 1412 corresponding to one or more functions. The program code portions 1402, 1404, 1406, 1408, 1410, 1412 may be executable by the processing unit 150, which thereby performs the functions. Hence, when it is referred to that the circuitry 130 is configured to execute a specific function, the processing unit 150 may execute program code portions 1402, 1404, 1406, 1408, 1410, 1412 corresponding to the specific function which may be stored on the memory 140. However, it is to be understood that one or more functions of the circuitry 130 may be hardware implemented and/or implemented in a specific integrated circuit. For example, one or more functions may be implemented using field-programmable gate arrays (FPGAs). Hence, one or more functions of the circuitry 130 may be implemented in hardware or software, or as a combination of the two.

The image sensor 110 is configured to capture digital images of the sample 182. Even though the image sensor 110 is illustrated as a separate entity in FIG. 1, it is to be understood that the image sensor 110 may form part of a camera. The image sensor 110 may be a charge-coupled device (CCD) sensor or a complementary metal-oxide semiconductor (CMOS) sensor. As is illustrated in the example of FIG. 1, the image sensor 110 may communicate with the circuitry 130 via the transceiver 160. However, it is to be understood that the image sensor 110 may communicate with the circuitry 130 via the data bus 170.

The microscope objective 120 is configured to image the sample 182 onto the image sensor 110. Put differently, the microscope objective 120 may be positioned such that an object plane of microscope objective 120 coincides with the sample 182 and an image plane of the microscope objective 120 coincides with the image sensor 110. It is to be understood that whether an image depicting the sample is formed on the image sensor 110 may depend on the illumination pattern used. For instance, in case the illumination system 100 is configured to illuminate the sample 182 using an illumination pattern similar to conventional microscope illumination (e.g., brightfield illumination), an image resembling the sample 182 may be formed on the image sensor 110. An illumination pattern similar to conventional microscope illumination may be formed by using a majority (or all) light sources of the illumination system 100. For instance, light sources of the illumination system 100 emitting light in directions corresponding to angles smaller than (and, possibly, equal to) a numerical aperture 122 of the microscope objective 120 may be used to form an illumination pattern similar to conventional microscope illumination. However, in case an illumination pattern is formed by only using light sources emitting light in directions corresponding to angles larger than the numerical aperture 122 of the microscope objective 120, the image forming on the image sensor 110 may not depict the sample 182. However, those images may comprise information associated with the sample 182 and that information may be used by one or more of the first inference function 1404, the second inference function 1408, and the image processing function 1410.

The numerical aperture of the microscope objective 120 may be 0.4 or lower. Put differently, the microscope objective 120 may have a magnification of 20 times or lower. Hence, a digital image captured using the microscope objective 120 may comprise information associated with a larger portion of the sample 182 compared to a digital image captured using a microscope objective having a relatively higher numerical aperture. This may, in turn, allow for a number of individual imaging positions needed to collect information associated with a majority (or the entirety) of the sample 182 to be reduced. Thus, a time period needed to capture information of a majority of the sample 182 may thereby be reduced.

It is to be understood that the microscope system 10 may comprise further optics which may be used together with the microscope objective 120 and the image sensor 110 when digital images of the sample 180 is captured. For example, the microscope system 10 may, as illustrated in the example of FIG. 1, comprise the relay lens 190 arranged such that the sample 182 may be imaged onto the image sensor 110 by the microscope objective 120 and the relay lens 190. Put differently, the microscope objective 120 and the relay lens 190 may form an optical system, and the object plane of that optical system may coincide with the sample 182 and the image plane of that optical system may coincide with the image sensor 110. It is further to be understood that the relay lens 190 may be chosen (e.g., focal length, material, size, etc.) depending on the magnification and/or the numerical aperture 122 of the microscope objective 120. The microscope objective 120 may be movable in the third direction Z by being coupled to a manual and/or motorized stage. The third direction Z may be parallel to an optical axis of the microscope system 10. Put differently, the microscope objective 120 may be movable in a focusing direction of the microscope system 10. The microscope objective 120 and/or the sample holder 180 may be movable such that a focused image of the sample 182 may be captured by the image sensor 110 (assuming that the illumination system 260 is configured for brightfield illumination). A position of the microscope objective 120 along the third direction Z may be controlled by the circuitry 130. For example, the circuitry 200 may be configured to execute a focus function 1412 configured to adjust a position of the microscope objective 120 along the third direction Z. The focus function 1412 may be configured to automatically adjust the position of the microscope objective 120 along the third direction Z. Put differently, the focus function 1412 may be an autofocus function. The focus function 1412 may, as in the example of FIG. 1, control the position of the microscope objective 120 along the third direction Z by communicating via the transceiver 160. However, it is to be understood that the focus function 1412 may control that position by communicating via the data bus 170.

The illumination system 100 is configured to illuminate the sample 182 with a plurality of illumination patterns. As is illustrated in FIG. 1, the illumination system 100 may comprise a plurality 102 of light sources. The light sources may be light-emitting diodes (LEDs). The light sources may be lasers. The light sources may emit incoherent light, quasi-coherent light, or coherent light. The light sources may be configured to emit monochromatic or polychromatic light. The light sources may be configured to emit light of a single color (e.g., red, green, or blue). The light sources may be configured to emit light of different colors (e.g., red, green, and blue). The light sources may be configured to emit white (or pseudo-white) light. Each illumination pattern of the plurality of illumination patterns may be formed by one or more light sources of the plurality of light sources. Put differently, each illumination pattern of the plurality of illumination patterns may be formed by emitting light from one or more light sources of the plurality 102 of light sources. Thus, the sample 182 may be illuminated under different illumination conditions (i.e., by using different illumination patterns), and more information (e.g., information associated with a refractive index) of the sample 182 may be collected by capturing digital images of the sample 182 when it is illuminated under the different illumination conditions. An illumination pattern may be formed by ten light sources or less. Each illumination pattern of the plurality of illumination patterns may be formed by ten light sources or less. An illumination pattern may be formed by five light sources or less. Each illumination pattern of the plurality of illumination patterns may be formed by five light sources or less. An illumination pattern may be formed by one light source. Each illumination pattern of the plurality of illumination patterns may be formed by one light source. Each light source of the plurality 102 light sources may be configured to illuminate the sample 182 from one direction of a plurality 104 of directions. Thus, an illumination pattern may be formed by emitting light from one or more directions of the plurality 104 of directions. Put differently, the illumination system 100 may be configured to simultaneously illuminate the sample 182 from one or more directions of the plurality 104 of directions. In case the illumination pattern is formed by more than one light source, the light sources may correspond to non-overlapping portions of the Fourier space associated with the sample 182.

a. At least one direction 104A of the plurality 104 of directions may correspond to an angle larger than the numerical aperture 122 of the microscope objective 120 being configured to image the sample onto the image sensor 110. The numerical aperture 122 of the microscope objective 120 may be a dimensionless number associated with a range of angles over which the microscope objective 120 accepts light. Hence, a direction larger than the numerical aperture 122 may be understood as a direction corresponding to an angle larger than the range of angles over which the microscope objective accepts light. By illuminating the sample 182 from a direction corresponding to an angle larger than the numerical aperture 122 of the microscope objective 120, the digital image captured for that angle may comprise information about higher spatial frequencies of the sample 182, and thereby finer details, than the microscope objective 120 normally allows (e.g., using conventional microscopy illumination). This may, in turn, allow for the microscope objective 120 to capture phase information associated with the sample 182 and/or information relating to details of the sample 182 not normally being resolvable by the microscope objective 120. Such information may, in turn, may be used by one or more of the first set of machine learning models, the second set of machine learning models, and the image processing machine learning model during the processing of the digital images. Put differently, by illuminating the sample 182 from a direction 104A corresponding to an angle larger than the numerical aperture 122 of the microscope objective 120 may result in digital images from which the machine learning model may extract more information associated with the sample 182 than what normally is allowed (e.g., when using conventional microscopy illumination). This may, e.g., allow for the image processing machine learning model to construct a digital image of the sample 182 having a relatively higher resolution (or magnification) than what would normally be allowed by the microscope objective 120 using conventional microscopy illumination (e.g., brightfield illumination).

As is further illustrated in FIG. 1, the plurality 102 of light sources may be arranged on a curved surface 106 being concave along at least one direction along the surface 106. As illustrated in the example of FIG. 1, the curved surface 106 may be concave in at least one direction (e.g., the second direction Y) along the surface 106. For example, the curved surface 106 may be a cylindrical surface. The curved surface 106 may be concave in two perpendicular directions (e.g., the first direction X and the second direction Y) along the surface 106. For example, the curved surface 106 may have a shape similar to a segment of a sphere. A segment of a sphere may be a spherical cap or a spherical dome. Arranging the plurality 102 of light sources on the curved surface 106 may be advantageous in that a distance R from each light source to a current imaging position P of the microscope system 10 may be similar. Since this distance is similar, an intensity of light emitted from each light source and reaching the current imaging position P may be similar. This may be understood as an effect of the inverse square law. Thus, the sample 182 may be illuminated by light having similar intensities for each direction in the plurality of directions 104. The distance R from each light source to the current imaging position P may be in a range from 4 cm to 15 cm. It may be advantageous to configure the illumination system 100 such that the distance R from each light source to the current imaging position P is large enough such that each light source may be regarded as a point source. This may allow the light to be quasi-coherent at the current imaging position P. The distance R from each light source to the current imaging position P may be larger than 15 cm, given that an intensity of light from at least a majority of the plurality 102 of light sources at the current imaging position P is high enough to produce the sets of digital images. In particular, the distance R between each light source may be larger than 15 cm in case one or more of the plurality 102 of light sources are lasers. However, it is to be understood that the plurality 102 of light sources may be arranged on a flat surface or on a surface having an irregular shape. It is further to be understood that FIG. 1 illustrates a cross section of the microscope system 10, and in particular the illumination system 100. Hence, the curved surface 106 of the illumination system 100 illustrated in FIG. 1 may be a cylindrical surface or a portion of a spherical surface (or of a quasi-spherical surface). The curved surface 106 of the illumination system 100 may be bowl shaped.

The curved surface 106 may be formed of facets 106A which is illustrated in the example of FIG. 2. Put differently, the curved surface 106 may be constructed by a plurality of flat surfaces. Thus, the curved surface 106 may be piecewise flat. The curved surface 106 may be a portion of a quasi-spherical surface comprising a plurality of facets or segments. Hence, the curved surface 106 may be a portion of a surface of a polyhedron. An example of such polyhedron may be a truncated icosahedron. The plurality 102 of light sources may be arranged on the facets 106A. Each light source may be arranged such that the light source is configured to emit light in a direction substantially parallel to a normal of the associated facet. It is to be understood, similar to the example illustrated in FIG. 1, that FIG. 2 illustrates a cross section of the illumination system 100. Hence, the curved surface 106 of the illumination system 100 illustrated in FIG. 2 may be a quasi-cylindrical surface or a portion of a quasi-spherical surface. The curved surface 106 of the illumination system 100 of FIG. 2 may have a shape similar to a bowl. Hence, the facets 106A of FIG. 2 are illustrated as lines, and it is to be understood that each facet 106A may be a flat surface having at least three sides. For instance, the curved surface 106 may be formed of facets having five sides and facets having six sides (e.g., similar to an inner surface of a soccer ball). Even though that the curved surface 106 in FIG. 2 is illustrated as a continuous surface, it is to be understood that each facet 106A may be separated from other facets. Hence, the curved surface 106 may be formed by a plurality of parts, and each facet 106A may be formed by at least one of those parts. Further, such parts may be arranged in contact with neighboring parts or may be arranged at a distance from neighboring parts. It is further to be understood that the number of facets 106A of the illumination system 100 illustrated in FIG. 2 is an example only, and other numbers of facets 106A may be used to form the curved surface 106 of the illumination system 100. It is furthermore to be understood that the number of light sources on each facet 106A is an example only, and that number may vary.

The first acquisition function 1402 is configured to control the illumination system 100 to illuminate the sample 182 with a first subset of the plurality of illumination patterns, and to control the image sensor 110 to capture a digital image of the sample 182 for each illumination pattern of the first subset of the plurality of illumination patterns, thereby forming a first input set of digital images.

The first inference function 1404 is configured to input the first input set of digital images into a first set of machine learning models configured to output a first inference output. The first set of machine learning models may be trained to output the first inference output.

The second acquisition function 1406 is configured to control the illumination system 100 to illuminate the sample 182 with a second subset of the plurality of illumination patterns, and to control the image sensor 110 to capture a digital image of the sample 182 for each illumination pattern of the second subset of the plurality of illumination patterns, thereby forming a second input set of digital images. The second subset of illumination patterns may be different from the first subset of illumination patterns. In this way, the first input set of digital images and the second input set of digital images may comprise less redundant information. Put differently, the first input set of digital images and the second input set of digital images may not comprise digital images captured under the same illumination conditions (i.e. using the same illumination patterns). The first acquisition function 1402 and the second acquisition function 1406 may be implemented as a single function. For instance, such function may be referred to as an acquisition function. A number of digital images in each of the first and second input sets of digital images may be larger than or equal to 30. The number of digital images in each of the first and second input sets of digital images may be equal to or smaller than 50. It is to be understood that these numbers are examples only, and it the number may be larger and/or smaller. For instance, in case the illumination pattern is formed by more than one light source of the plurality of light sources, the number of digital images needed may be lower. As a further example, in case the image processing machine learning model is trained to construct a digital image having a relatively higher resolution than the images of the first and second input sets of digital images, the number of digital images may depend on the difference in resolution. Put differently, the number of digital images in the first and second input sets of digital images may depend on the increase in resolution of the constructed digital image compared to the resolution of the digital images in the first and second input sets.

The circuitry 130 may be configured to execute the first inference function 1404 and the second acquisition function 1406 at least partially in parallel. Put differently, the inference of the first input set of digital images may be performed at least partially in parallel with the acquiring of the second input set of digital images. Preferably, the second acquisition function 1406 is executed as soon as the first acquisition function 1402 has finished (i.e., as soon as the first input set of digital images has been acquired). Hence, the second acquisition function 1406 may be executed prior to the first inference function 1404.

The second inference function 1408 is configured to input the second input set of digital images into a second set of machine learning models configured to output a second inference output. The second set of machine learning models may be trained to output the second inference output. The second set of machine learning models is different from the first set of machine learning models.

The processing function 1410 is configured to input the first inference output and the second inference output into an image processing machine learning model being trained to process the plurality of digital images of the sample 182 using the first inference output and the second inference output. The first inference output and the second inference output may be seen as intermediate outputs of the image processing performed by the circuitry 130. The intermediate outputs may comprise compressed data. A structure of the compressed data may vary. For instance, the structure of the compressed data may depend on a design of the machine learning models (e.g., memory restrictions, processing power restrictions, layouts, designs, etc.) of the sets of machine learning models. Further, the structure of the compressed data may depend on an output type of the image processing machine learning model. The intermediate outputs may comprise information which is used by the image processing machine learning model to output an image processing output. Put differently, the first and second sets of machine learning models may output intermediate outputs which may be used by the image processing machine learning model to form an image processing output. The first and second sets of machine learning models may output information related to features of the sample 182. These features are then relayed to the image processing machine learning model which may combine the features into an output. The image processing machine learning model may be trained to process the plurality of digital images using the first inference output and the second inference output by being trained to: construct a digital image of the sample 182; and/or classify the sample 182 into one or more classes; and/or detect one or more objects within the sample 182. In case the image processing machine learning model is trained to construct a digital image of the sample, that constructed digital image of the sample may have a relatively higher resolution than a digital image captured by the microscope system using conventional microscopy illumination (e.g., brightfield conditions). Put differently, the image processing machine learning model may be trained to construct a digital image of the sample having a relatively higher resolution than a digital image of the first input set of digital images and/or a digital image of the second input set of digital images.

By illuminating the sample 182 with a plurality of different illumination patterns and capturing a digital image for each illumination pattern of the plurality of illumination patterns, more information associated with the sample 182 may be captured than what normally is possible by a conventional microscope (e.g., using conventional microscope illumination) used to image the sample. This can be understood as information of different portions of Fourier space (i.e., the spatial frequency domain) of associated with the sample are captured for different illumination patterns (e.g., for different illumination directions). This technique may be known in the art as Fourier Ptychography. Further, by illuminating the sample 182 with a plurality of different illumination patterns and capturing a digital image for each of the plurality of illumination patterns, information regarding a refractive index associated with the sample 182 may be captured. This can be understood as an effect of light refraction being dependent on an angle of incidence for light illuminating the sample 182 and the refractive index of the sample 182. Information regarding the refractive index of the sample 182 may, in turn, allow phase information (typically referred to as quantitative phase within the art) associated with the sample 182 to be determined. Since the plurality of digital images comprises information associated with one or more of fine details of the sample 182, a refractive index associated with the sample 182, and phase information associated with the sample 182, this information may be used by one or more of the first set of machine learning models, the second set of machine learning models, and the image processing machine learning model. This may, in turn, allow for more information associated with the sample 182 to be extracted from the plurality of digital images of the sample 182 than what would be allowed in case the plurality of digital images were captured from only one direction or by using conventional microscopy. Using conventional microscopy (e.g., by simultaneously illuminating the sample 182 from a majority of the plurality of directions up to the numerical aperture 122 of the microscope objective 120 used to image the sample 182 in FIG. 1), it may be difficult, or even impossible, to capture information associated with the refractive index associated with the sample 182 and/or phase information associated with the sample 182. In particular, it may not be possible to construct a digital image depicting the sample 182 and having a relatively higher resolution (or magnification) than what normally is allowed by the microscope objective 120.

Figure 3:
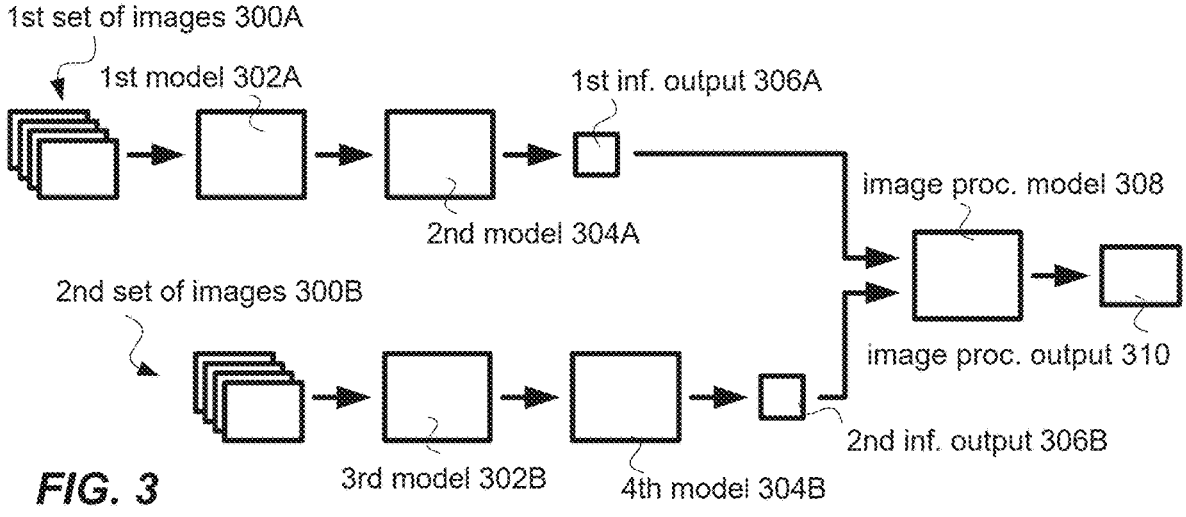
FIG. 3 is a schematic illustration of a processing of a first input set of digital images and a second input set of digital images.

The microscope system 10 of FIG. 1, possibly with the illumination system 100 illustrated in FIG. 2, thereby allows for a time period needed for the processing of the plurality of digital images of the sample 182 to be reduced. In particular, since the processes of acquiring the digital images and the inference of the acquired digital images are time-consuming, it may be advantageous to separate the acquisition of the digital images of the sample 182 in at least two instances (e.g., by the first and second acquisition functions 1402, 1406 and the first and second inference functions 1404, 1408). The concept is schematically illustrated in FIG. 3. Here, the first input set of digital images 300A is input into the first set of machine learning models 302A, 304A, which will form the first inference output 306A. The first set of machine learning models 302A, 304A is in FIG. 3 represented by a first machine learning model 302A and a second machine learning model 304A. However, it is to be understood that this is an example only, and that the number of machine learning models in the first set of machine learning models 302A, 304A may vary. After the acquisition of the first input set of digital images 300A, the second input set of digital images 300B is acquired. As discussed above, the acquisition of the second input set of digital images 300B may be performed at least partially in parallel with the processing of the first input set of digital images 300A by the first set of machine learning models 302A, 304A. After its acquisition, the second input set of digital images 300B is input into the second set of machine learning models 302B, 304B, which will form the second inference output 306B. The second set of machine learning models 302B, 304B is in FIG. 3 represented by a third machine learning model 302B and a fourth machine learning model 304B. However, it is to be understood that this is an example only, and that the number of machine learning models in the second set of machine learning models 302B, 304B may vary. Subsequent to the first inference output 306A and the second inference output 306B being formed, they are input into the image processing machine learning model 308. The first inference output 306A and the second inference output 306B may be input simultaneously or sequentially into the image processing machine learning model 308. In case they are input sequentially, the image processing machine learning model 308 may be configured to initiate the image processing as soon as it has received the first inference output 306A. Put differently, the image processing machine learning model 308 may be configured to start forming an image processing output 310 as soon as it has received the first inference output 306B. This may allow for a further reduction of the time needed for processing the digital images of the sample. As discussed above, the image processing output 310 from the image processing machine learning model may comprise one or more of a constructed digital image of the sample (i.e., a digital image depicting the sample), a classification of the sample into one or more classes, and a detection of one or more objects within the sample. The image processing output 310 may, in turn, be used in an analysis of the sample. Hence, using the microscope system 10 of FIG. 1 may allow for a reduction of time needed to analyze samples.

Figure 4:
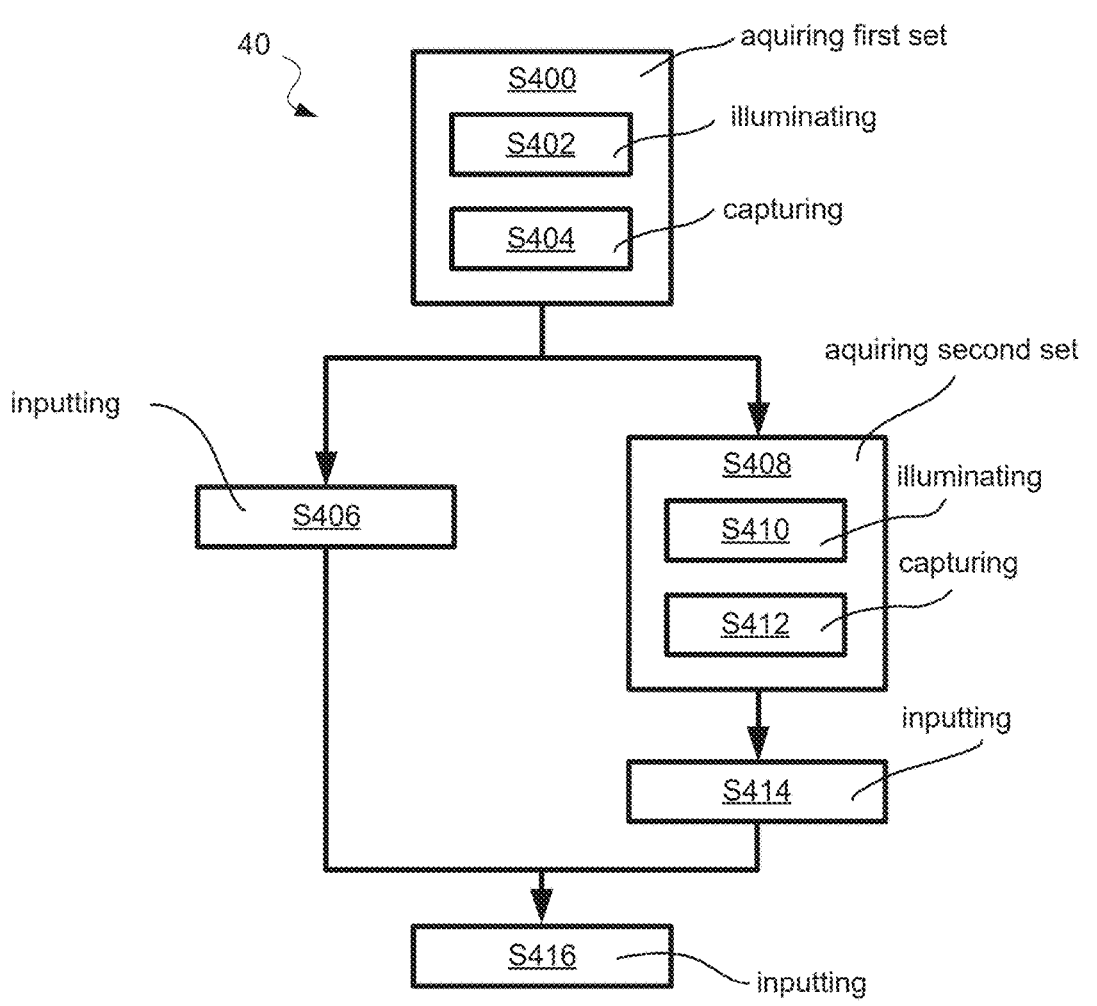
FIG. 4 is a block scheme of a method for processing digital images of a sample.

FIG. 4 is a block scheme of a method 40 for processing a plurality of digital images of a sample. The method 40 may be a computer-implemented method. The method 40 comprises a. acquiring S400 a first input set of digital images by: illuminating S402, by an illumination system, the sample with a first subset of a plurality of illumination patterns, and capturing S404 a digital image of the sample for each illumination pattern of the first subset of the plurality of illumination patterns, thereby forming the first input set of digital images. The illumination system may comprise a plurality of light sources, and wherein each illumination pattern of the plurality of illumination patterns may be formed by one or more light sources of the plurality of light sources. Each light source of the plurality of light sources may be configured to illuminate the sample from one direction of a plurality of directions. At least one direction of the plurality of directions may correspond to an angle larger than a numerical aperture of a microscope objective used to image the sample. The method 40 further comprises b. inputting S406 the first input set of digital images into a first set of machine learning models configured to output a first inference output. The method 40 further comprises c. acquiring S408 a second input set of digital images by: illuminating S410, by the illumination system, the sample with a second subset of the plurality of illumination patterns, and capturing S412 a digital image of the sample for each illumination pattern of the second subset of the plurality of illumination patterns, thereby forming the second input set of digital images. Steps b and c may be performed at least partially in parallel. Put differently, the act of inputting S406 the first input set of digital images into the first set of machine learning models and the act of acquiring S408 the second input set of digital images may be performed at least partially in parallel. The second subset of illumination patterns may be different from the first subset of illumination patterns. Put differently, one or more illumination patterns of the first subset of illumination patterns may be different than one or more illumination patterns of the second subset of illumination patterns. All illumination patterns of the first subset of illumination patterns may be different from all illumination patterns of the second subset of illumination patterns. The method 40 further comprises d. inputting S414 the second input set of digital images into a second set of machine learning models configured to output a second inference output. The second set of machine learning models is different from the first set of machine learning models. The method 40 further comprises e. inputting S416 the first inference output and the second inference output into an image processing machine learning model being trained to process the plurality of digital images of the sample using the first inference output and the second inference output. The image processing machine learning model may be trained to process the plurality of digital images using the first inference output and the second inference output by being trained to one or more of: construct a digital image of the sample; classify the sample into one or more classes; and detect one or more objects within the sample.

A skilled person would be aware of machine learning, and in particular as to how a machine learning model may be trained and/or how a trained machine learning model may be used. However, in brief, the machine learning model may be a type of supervised machine learning model, for example a network such as U-net or Pix2pix. The machine learning model may be a transformer-based network such as SwinIR. The machine learning model may be a convolutional neural network. The machine learning model may be trained to predict a desired output using example input training data and a ground truth, i.e. the "correct" or "true" output. Put differently, the ground truth may be used as a label for the input training data. The input training data may comprise data pertaining to different outcomes, and each input training data may thereby be associated with a ground truth associated with that particular input training data. Hence, each input training data may be labelled with an associated ground truth (i.e., "correct" or "true" output). The machine learning model may comprise a plurality of layers of neurons, and each neuron may represent a mathematical operation which is applied to the input training data. Typically, the machine learning model comprises an input layer, one or more hidden layers, and an output layer. The first layer may be referred to as the input layer. The output of each layer (except the output layer) in the machine learning model may be fed to a subsequent layer, which in turn produces a new output. The new output may be fed to a further subsequent layer. The output of the machine learning model may be an output of the output layer. The process may be repeated for all layers in the machine learning model. Typically, each layer further comprises an activation function. The activation function may further define the output of a neuron of the layer. For example, the activation function may ensure that the output from a layer is not too large or too small (e.g., tending towards positive or negative infinity). Further, the activation function may introduce non-linearity into the machine learning model. During the training process, weights and/or biases associated with the neurons of the layers may be adjusted until the machine learning model produces predictions for the input training data that reflect the ground truth. Each neuron may be configured to multiply the input to the neuron with a weight associated with that neuron. Each neuron may be further configured to add a bias associated with that neuron to the input. Put differently, an output from a neuron may be a sum of the bias associated with the neuron and a product of the weight associated with the neuron and the input. The weights and biases may be adjusted in a recursive process and/or an iterative process. This may be known as backpropagation within the art. A convolutional neural network may be a type of neural network comprising one or more layers that represents a convolution operation. In this context, the input training data comprises digital images. A digital image may be represented as matrix (or as an array), and each element in the matrix (or array) may represent a corresponding pixel of the digital image. The value of an element may thereby represent a pixel value of the corresponding pixel in the digital image. Hence, the input and output to the machine learning model may be numerical (e.g., a matrix or an array) representing digital images. In this context, the input is a set of digital images (i.e., the training set or the input set). Thus, the input to the machine learning model may be a plurality of matrices, or a three-dimensional matrix. It is to be understood that the machine learning model may take further input during training.

In this specific case, the first set of machine learning models, the second set of machine learning models, and the image processing machine learning model are trained using a first training set of digital images, a second training set of digital images, and a ground truth. The first training set of digital images is acquired in a manner similar to the acquisition of the first input set of digital images, and the second training set of digital images are acquired in a manner similar to the acquisition of the second input set of digital images. Put differently, the first training set of digital images may comprise digital images captured when a training sample is illuminated with the first subset of illumination patterns, and the second training set of digital images may comprise digital images captured when a training sample is illuminated with the second subset of illumination patterns. The ground truth may vary depending on the desired image processing output from the (trained) image processing machine learning model. For instance, in case a digital image depicting a sample is part of the desired output, the ground truth may comprise a digital image of a training sample. In particular, in case the desired output is a digital image having a relatively higher resolution (or magnification) than a digital image of the first and/or second input set of digital images, the ground truth may comprise a digital image depicting the training sample and having a resolution (or magnification of the training sample) relatively higher than a digital image of the first and/or second training set of digital images. Further, in case the desired output is a classification of a sample and/or detected objects within a sample, the ground truth may comprise a classification of the training sample and/or information associated with objects within the training sample. Further, a type of data which constitutes the first and second inference outputs may vary depending on the type of processing that the image processing machine learning model is trained to perform. For instance, the first and second inference outputs may be digital images (or precursors to digital images) from which the image processing machine learning model may be trained to construct a digital image depicting the sample. As a further example, the first and second inference outputs may be one or more of an array, a vector, and a matrix comprising data which may be used by the image processing machine learning model to one or more of constructing a digital image of the sample, classifying the sample into one or more classes, and detecting one or more objects within the sample.

During the training process, the first set of machine learning models, the second set of machine learning models, and the image processing machine learning model may be regarded as a common machine learning model. Thus, the first and second inference outputs may be determined during training of the common machine learning model. Hence, the common machine learning model may be trained using the first and second training set of digital images as input and the ground truth as the desired output. Put differently, the common machine learning model may be trained until a difference between an output of the common machine learning model and the ground truth is smaller than a threshold. This difference may within the art be referred to as a loss function. It may be preferred to train the common machine learning model until the loss function is minimized. Put differently, the common machine learning model may be trained until the difference between the output of the common machine learning model and the ground truth is minimized. The training process may be repeated for a plurality of different training samples (e.g., different training samples of the same and/or of different types), which may allow for the first set of machine learning models, the second set of machine learning models, and the image processing machine learning model to process digital images of a wider range of sample types and/or with higher accuracy. Hence, the first set of machine learning models, the second set of machine learning models, and the image processing machine learning model may be trained as a single machine learning model. However, when processing digital images of a sample to be analyzed, the first sets of machine learning models, the second sets of machine learning models, and the image processing machine learning models may be treated as separate processes, whereby parallelization of the image processing may be allowed. A structure (e.g., number of layers, activation functions, etc.) of the first set of machine learning models may be the same as a structure of the second set of machine learning model. However, during the training process, weights (i.e., parameters that are determined during the training process) associated with the structure (e.g., the layers) of the first set of machine learning models may be different from weights associated with the structure of the second set of machine learning models. This may be the case since the first and second sets of machine learning models are trained using different sets of digital images.

The person skilled in the art realizes that the present inventive concept by no means is limited to the preferred variants described above. On the contrary, many modifications and variations are possible within the scope of the appended claims.

For example, the present inventive concept has been described as using a first set of machine learning models and a second set of machine learning models. However, it is to be understood that this is an example only, and additional sets of machine learning models may be used. For instance, in addition to the first and the second sets of machine learning models, a third input set of digital images may be input into a third set of machine learning models. In such case, the third input set of digital images may be acquired at least partially in parallel with the second set of machine learning models forming the second inference output.

As a further example, even though it is not explicitly illustrated in FIG. 1, it is envisioned that, at least, the circuitry and the image sensor may be comprised in a camera.

Additionally, variations to the disclosed variants can be understood and effected by the skilled person in practicing the claimed invention, from a study of the drawings, the disclosure, and the appended claims.

The invention claimed is:

1. A method for processing a plurality of digital images of a sample, the method comprising:
   a. acquiring a first input set of digital images by:
      illuminating, by an illumination system, the sample with a first subset of a plurality of illumination patterns, wherein the illumination system comprises a plurality of light sources, wherein each light source of the plurality of light sources is configured to illuminate the sample from one direction of a plurality of directions, and wherein each illumination pattern of the plurality of illumination patterns is formed by one or more light sources of the plurality of light sources, and
      capturing a digital image of the sample for each illumination pattern of the first subset of the plurality of illumination patterns, thereby forming the first input set of digital images;
   b. inputting the first input set of digital images into a first set of machine learning models configured to output a first inference output;
   c. acquiring a second input set of digital images by:
      illuminating, by the illumination system, the sample with a second subset of the plurality of illumination patterns, and
      capturing a digital image of the sample for each illumination pattern of the second subset of the plurality of illumination patterns, thereby forming the second input set of digital images;
   d. inputting the second input set of digital images into a second set of machine learning models configured to output a second inference output, wherein the second set of machine learning models is different from the first set of machine learning models; and
   e. inputting the first inference output and the second inference output into an image processing machine learning model being trained to process the plurality of digital images of the sample using the first inference output and the second inference output; and
   wherein steps b and c are performed at least partially in parallel.

2. The method according to claim 1, wherein at least one direction of the plurality of directions corresponds to an angle larger than a numerical aperture of a microscope objective used to image the sample.

3. The method according to claim 1, wherein the first subset of illumination patterns is different from the second subset of illumination patterns.

4. The method according to claim 1, wherein the image processing machine learning model is trained to process the plurality of digital images using the first inference output and the second inference output by being trained to one or more of:
   construct a digital image of the sample;
   classify the sample into one or more classes; and
   detect one or more objects within the sample.

5. A microscope system comprising:
   an illumination system configured to illuminate a sample with a plurality of illumination patterns, wherein the illumination system comprises a plurality of light sources, wherein each light source of the plurality light sources is configured to illuminate the sample from one direction of a plurality of directions, and wherein each illumination pattern of the plurality of illumination patterns is formed by one or more light sources of the plurality of light sources;

an image sensor configured to capture digital images of the sample;

a microscope objective configured to image the sample onto the image sensor; and circuitry configured to execute:

a first acquisition function configured to control the illumination system to illuminate the sample with a first subset of the plurality of illumination patterns, and to control the image sensor to capture a digital image of the sample for each illumination pattern of the first subset of the plurality of illumination patterns, thereby forming a first input set of digital images, a first inference function configured to input the first input set of digital images into a first set of machine learning models configured to output a first inference output, a second acquisition function configured to control the illumination system to illuminate the sample with a second subset of the plurality of illumination patterns, and to control the image sensor to capture a digital image of the sample for each illumination pattern of the second subset of the plurality of illumination patterns, thereby forming a second input set of digital images, a second inference function configured to input the second input set of digital images into a second set of machine learning models configured to output a second inference output, wherein the second set of machine learning models is different from the first set of machine learning models, and a processing function configured to input the first inference output and the second inference output into an image processing machine learning model being trained to process the plurality of digital images of the sample using the first inference output and the second inference output;

wherein the circuitry is configured to execute the first inference function and the second acquisition function at least partially in parallel.

6. The microscope system according to claim 5, wherein at least one direction of the plurality of directions corresponds to an angle larger than a numerical aperture of the microscope objective being configured to image the sample onto the image sensor.

7. The microscope system according to claim 5, wherein the plurality of light sources is arranged on a curved surface being concave along at least one direction along the surface.

8. The microscope system according to claim 7, wherein the curved surface is formed of facets.

9. The microscope system according to claim 5, wherein a numerical aperture of the microscope objective is 0.4 or lower.

10. The microscope system according to claim 5, wherein the image processing machine learning model is trained to process the plurality of digital images using the first inference output and the second inference output by being trained to:

construct a digital image of the sample; and/or classify the sample into one or more classes; and/or detect one or more objects within the sample.

\* \* \* \* \*